United States Patent [19]

Gilmour

[11] 4,311,391
[45] Jan. 19, 1982

[54] PASSIVE FIBER OPTIC SONAR SYSTEM

[75] Inventor: George A. Gilmour, Severna Park, Md.

[73] Assignee: Westinghouse Electric Corp., Pittsburgh, Pa.

[21] Appl. No.: 107,800

[22] Filed: Dec. 27, 1979

[51] Int. Cl.³ .......................................... G01N 21/41
[52] U.S. Cl. ...................................... 356/361; 73/655
[58] Field of Search ........................................ 356/4–5, 356/361; 350/358; 73/655, 656, 657

[56] References Cited

U.S. PATENT DOCUMENTS

| | | | |
|---|---|---|---|
| 3,122,922 | 3/1964 | Kramer | 73/398 |
| 3,249,105 | 5/1966 | Polanyi | 128/2.05 |
| 3,360,987 | 1/1968 | Flower et al. | 73/71.3 |
| 3,518,941 | 7/1970 | Keithley | 102/18 |
| 3,831,137 | 8/1974 | Cuomo | 340/8 R |
| 3,856,378 | 12/1974 | Brandt et al. | 350/96.13 |
| 3,903,496 | 9/1975 | Stimler | 340/2 |
| 3,903,497 | 9/1975 | Stimler et al. | |
| 4,068,191 | 1/1978 | Zemon et al. | 331/94.5 M |

OTHER PUBLICATIONS

Becaro et al., "Single Fiber Interferometric Acoustic Sensor", *Applied Optics*, vol. 17, No. 3, p. 330, 1978.
Cole et al., "Fiber-Optic Detection of Sound", *J. Acout. Soc. Am.*, vol. 62, No. 9, 11/77, p. 1136.
Bacaro et al., "Optical Fiber Acoustic Sensor", *Applied Optics*, vol. 16, No. 7, p. 1761, Jul. 1977.

*Primary Examiner*—John K. Corbin
*Assistant Examiner*—Matthew W. Koren
*Attorney, Agent, or Firm*—D. Schron

[57] ABSTRACT

A fiber optic sonar system wherein first and second optical fibers are wound on a common mandrel and provided with a light energy beam. An acoustic signal differentially varies the index of refraction of the optical fibers to result in an interference pattern dependent upon the frequency of the received acoustic signal or signals. The apparatus is operable to form one or more hollow conical receiver beams.

8 Claims, 12 Drawing Figures

PASSIVE FIBER OPTIC SONAR SYSTEM

BACKGROUND OF THE INVENTION

1. Field of the Invention

The invention in general relates to acoustic detection systems and more particularly to one utilizing fiber optics.

2. Description of the Prior Art

A fiber optic sonar system is based on the principle that acoustic waves travelling in a medium vary the index of refraction of the medium and therefor the presence of acoustic waves may be detected by an optical interferometer.

The system generally includes two light conducting optical fibers one of which is exposed to the acoustical waves and the other of which is isolated therefrom. A light beam transmitted into the two fibers by a laser light source is modulated in the optical fiber exposed to the acoustical waves and the second beam, acoustically isolated, serves as a fixed reference beam. The modulated and unmodulated beams are combined by a beam splitter to form an interference pattern that is detected by a photodetector device resulting in an electrical signal at the acoustic frequency.

The present invention utilizes these fiber optic principles in a sonar system which is able to detect the actual movement of a target into or out of an area under surveillance.

SUMMARY OF THE INVENTION

A fiber optic sonar system is provided having a support member which includes a first optical fiber winding arranged in a plurality of coils disposed along and about the support member. A second optical fiber winding is provided and is also arranged in a plurality of coils disposed along and about the support member with the coils of the first and second windings being alternately arranged along the support member. A light transmitter is optically coupled to the optical fiber windings for projecting a light energy beam into them and means are provided for combining the light energy beams which emerge from the windings. The emerging beams are combined and detected, the result being an electrical signal and means are provided for analyzing this signal to detect the presence of certain frequencies.

The apparatus is operable to form multiple hollow conical beams nested one within the other, each beam being associated with a particular acoustical frequency. As the target moves through the area under surveillance it will be detected by one or more of the conical beams.

DESCRIPTION OF THE PREFERRED EMBODIMENT

Figure 1:
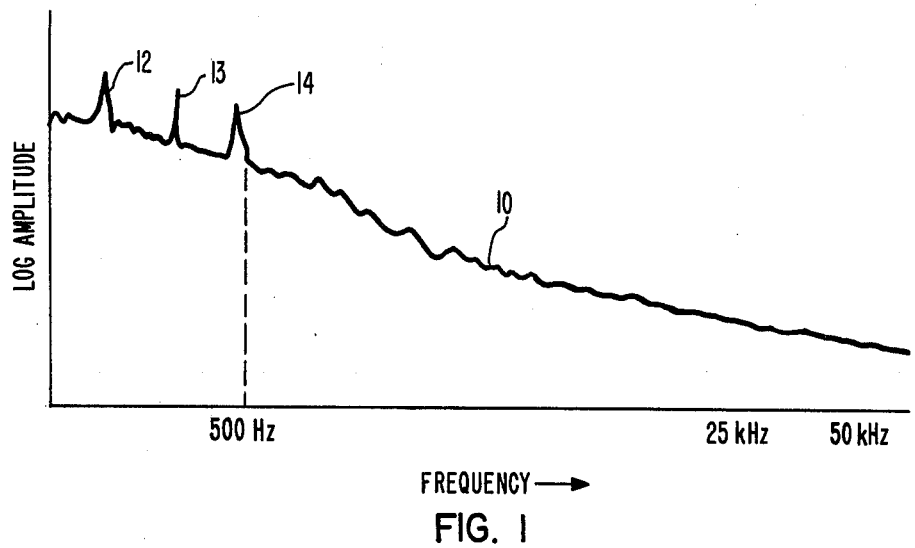
FIG. 1 illustrates a typical noise spectrum of a vessel.

In FIG. 1 curve 10 illustrates a typical noise spectrum of a vessel travelling through the water. Frequency is plotted on the horizontal axis and noise level on the vertical axis. The curve illustrates three peaks 12, 13 and 14 occurring below 500 Hertz and representing for example various machinery and propeller noise. Hydrodynamic noise such as radiated flow noise, resonant excitation, and certain cavitation occur in the approximate range of 25 to 50 kilohertz.

Figure 2A:
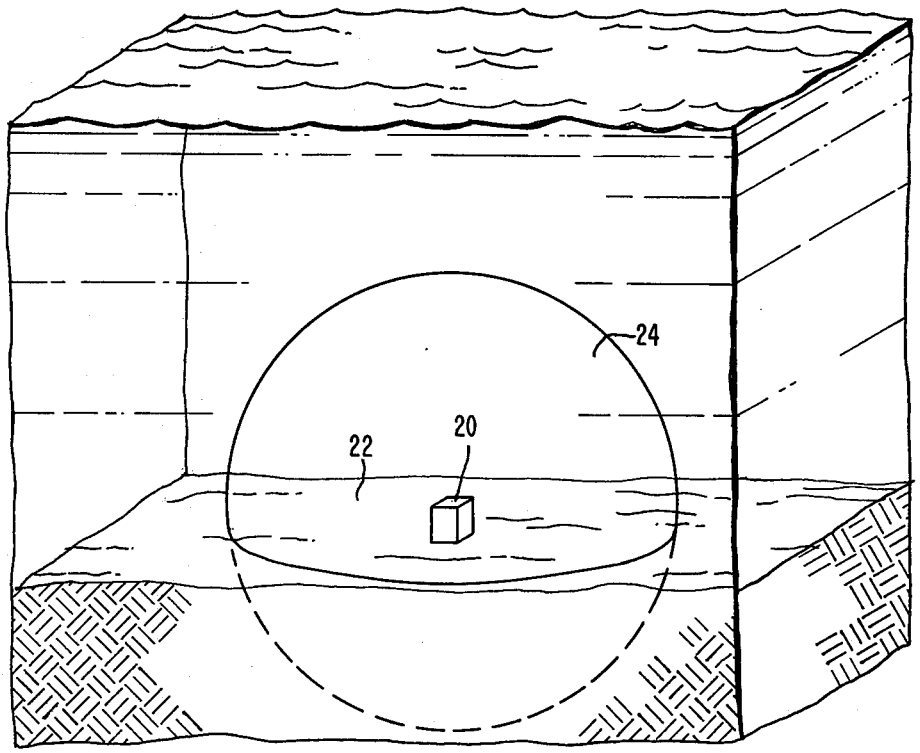
FIGS. 2A and 2B illustrate beam patterns for a target detection and intrusion system.
Figure 2B:
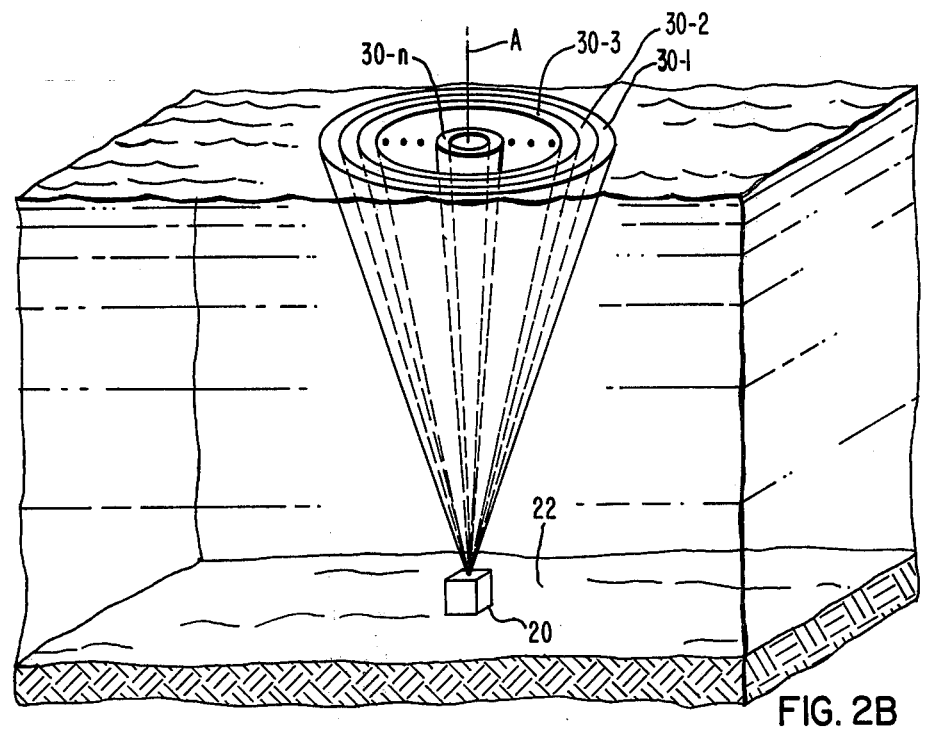

FIGS. 2A and 2B illustrate the operation of a surveillance or intrusion detection system. In FIG. 2A passive detection apparatus 20 which sits on (or above) the bed 22 of a body of water is operable to form an omnidirectional receiver beam 24 for detecting at relatively long ranges, the low frequencies produced by a vessel, such as indicated by peaks 12, 13 and 14 of FIG. 1. Once detection has been made, the apparatus will switch to a directional beam arrangement as illustrated in FIG. 2B for detection of the higher frequency noise.

The passive directional detection system forms a plurality of hollow conical beams 30-1, 30-2, 30-3 . . . 30-n, the hollow cones being concentrically arranged around a common axis A. As a target approaches the area under investigation by the apparatus, and it is emitting a range of acoustic frequencies corresponding to the conical receiving beams, it will first be detected by beam 30-1 and depending upon its movement, sequentially by one or more of the other concentric beams. The apparatus may be designed such that if a target vessel is detected by a predetermined one of the beams, appropriate action may be taken.

Apparatus for forming a hollow conical receiving beam is described in U.S. Pat. No. 4,052,693. The arrangement utilizes a plurality of active transducer elements having a particular orientation and relative spacing so as to form a single hollow conical beam having a certain depression angle. In the present invention, one, or a plurality of concentric beams may be formed utilizing fiber optic techniques, and to this end reference is made to FIG. 3.

Figure 3:
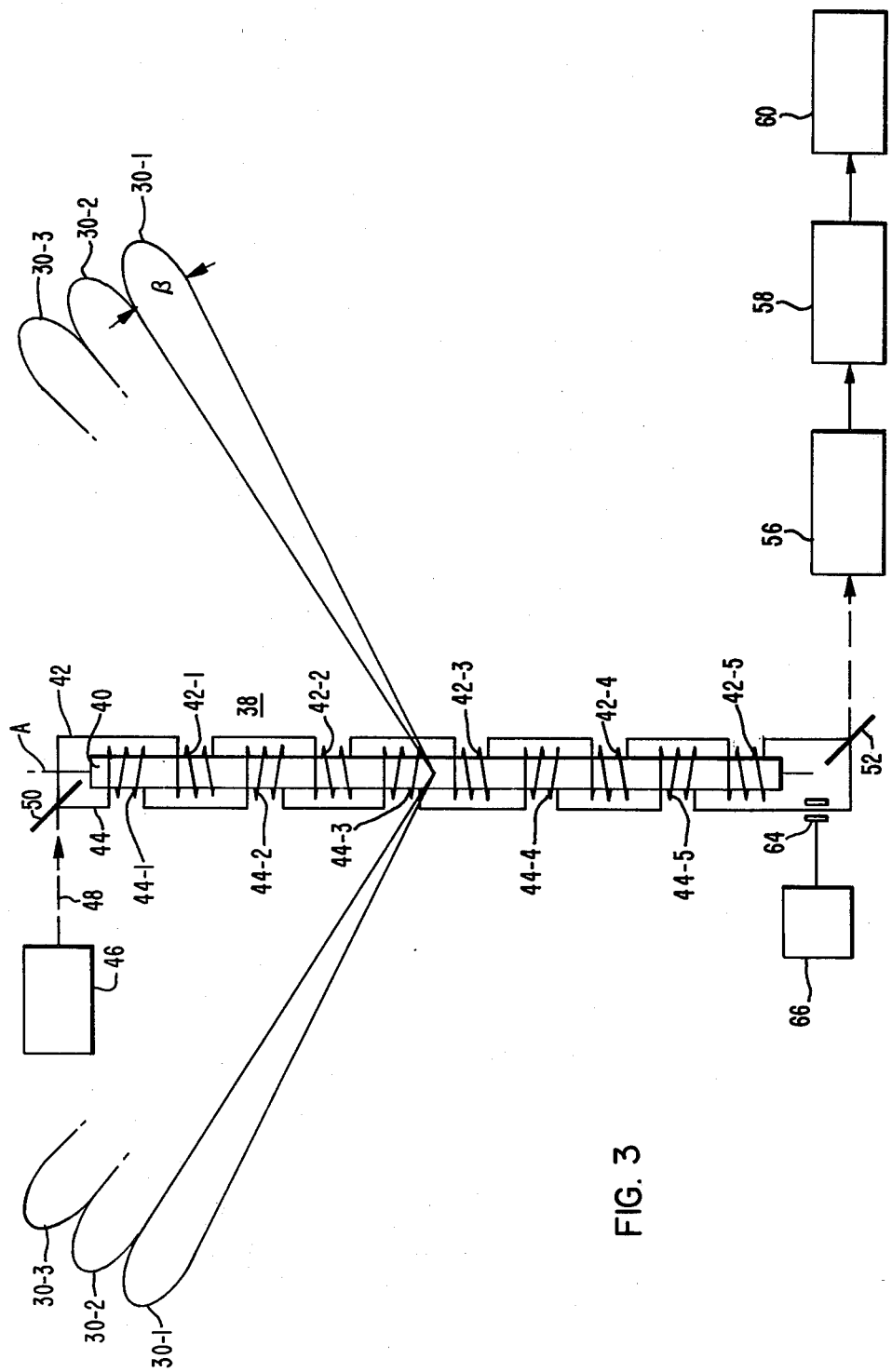
FIG. 3 illustrates one embodiment of the present invention.

The fiber optic passive sonar transducer apparatus 38 of FIG. 3 includes a central support member or mandrel 40 concentrically arranged along axis A. A first flexible light conducting optical fiber 42 is arranged in a plurality of first coils 42-1 through 42-5 disposed along and about support member 40. A second flexible light conducting optical fiber winding 44 includes a plurality of second coils 44-1 through 44-5 also disposed along and about support member 42 with the coils of the first winding and coils of the second winding being alternately arranged. Although only five coils for each winding are illustrated with each coil having a few turns, in actuality there could be many more coils each having hundreds or thousands of turns. For clarity the coils are shown to be wound in opposite directions, however, in actual practice the coils of both windings 42 and 44 may be wound in the same direction.

A light source, preferably a laser light source 46 projects a beam of coherent light 48 which enters a first end of winding 42 and a first end of winding 44 by means of the beam splitter arrangement 50.

The two windings 42 and 44 constitute differential windings both exposed to the pressure of the acoustic signals emanating from a target with the pressure variations being operable to vary the optical index of refraction within the windings resulting in an interference pattern. The light energy beams travelling in the windings emerge at the other end of the windings and are combined by means of beam splitter 52 which results in the optical beating of the two light beams with the consequent interference pattern being detected by means of a photodetector 56 which converts the optical signal to an electrical signal.

The electrical signal is analyzed such as by means of a spectrum analyzer 58 for detecting whether or not certain frequencies are present in the signal, such frequencies corresponding to particular conical beams. As these frequencies are detected by means of the spectrum analyzer 58 an indication thereof is provided to some utilization apparatus 60 for taking appropriate action.

It may be desirable to initially set up a desired optical phase relationship between the light beams in the two windings and accordingly means are provided for applying a controlled pressure to at least one of the windings to vary the index of refraction. This may take the form of a transducer 64 coupled to winding 44 and provided with a DC control signal from control device 66.

Superimposed on FIG. 3 are some of the conical beams, 30-1 through 30-3, formed by the apparatus, with each beam being at a different angle with respect to the central axis A and each being associated with a particular different frequency, the outer beam 30-1 corresponding to a highest frequency of interest $F_0$ of wavelength $\lambda_0$. The last beam formed, for the lowest detectable frequency, would be an end fire beam pointing straight up. The beamwidth $\beta$ of a particular beam decreases with increasing length of the array. The principles of operation of the apparatus of FIG. 3 may be described with additional reference to FIGS. 4A and 4B.

Figure 4A:
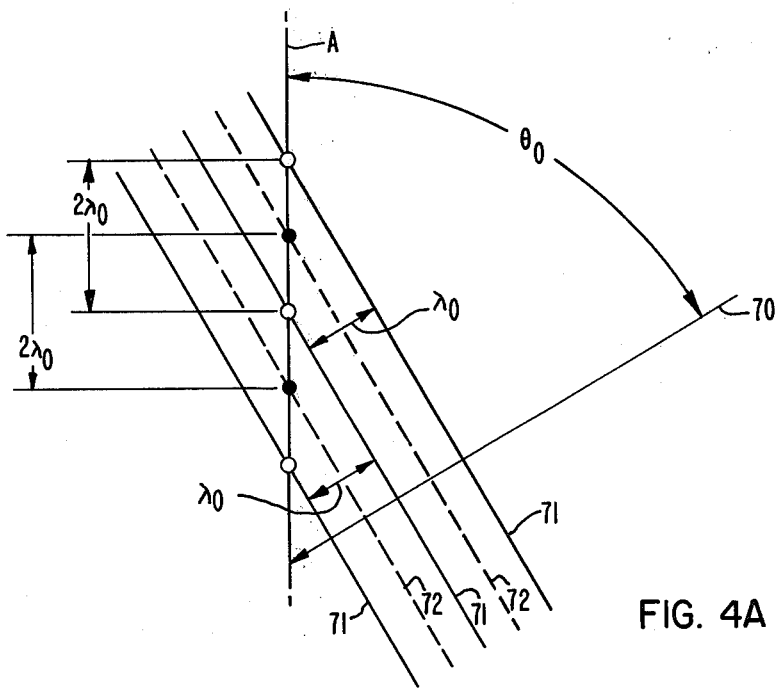
FIGS. 4A and 4B illustrate certain distances for understanding the operation of the apparatus of FIG. 3.

In FIG. 4A the small circles arranged along axis A represent the centers of the coils of the first winding while the dots represent the centers of the coils of the second winding. Only a few such coil representations are illustrated. The axial distance between coil centers of the same winding is $2\lambda_0$ and accordingly the distance between centers of adjacent coils would be $\lambda_0$. Acoustic energy detected by the outermost cone, that is, energy of frequency $f_0$ and wavelength $\lambda_0$, is travelling in the direction of arrow 70 and impinges upon the coil array at an angle $\theta_0$ which is actually the half angle of the cone. The wave crests of the acoustic signal are represented by solid lines 71 while the wave troughs are represented by dotted lines 72. The distance between wave crests is $\lambda_0$ and it is seen that the wave crests simultaneously impinge upon all of the coils of the first winding while the wave troughs simultaneously impinge upon all of the coils of the second winding. The first set of coils therefor experience a maximum deviation in a first direction of the value of the index of refraction, while the coils of the second winding experience a maximum deviation in an opposite direction at the instant of time illustrated in FIG. 4A. As the wave progresses in its travel, the variation in index of refraction in the two windings operate to produce a certain beat signal in the resulting optical wave, this beat signal corresponding to the frequency $f_0$, and therefore to reception of acoustic energy by the outermost cone 30-1.

With the distance between coils of the same winding being $2\lambda_0$, and the distance between wave crest being $\lambda_0$, it may be demonstrated that angle $\theta_0$ is 60°.

Figure 4B:
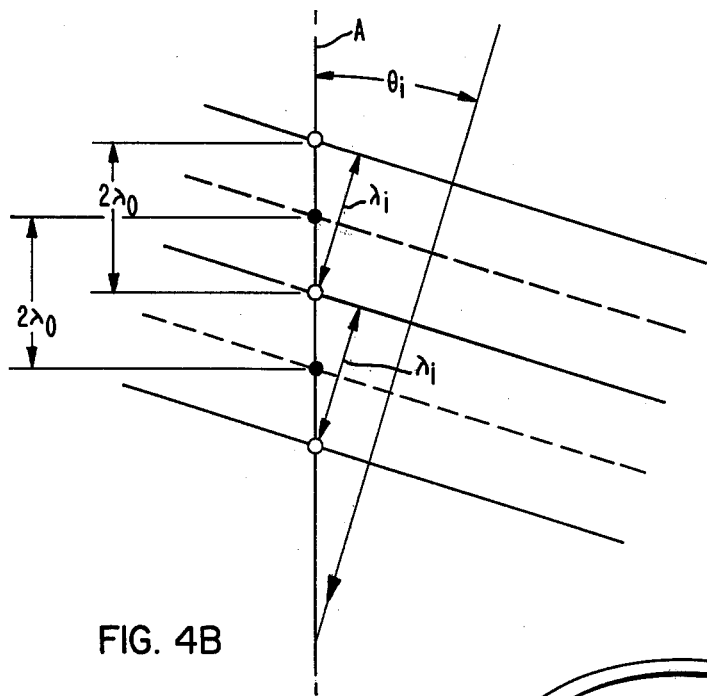

In general, and as illustrated in FIG. 4B, an acoustic signal of frequency $f_i$ and accordingly a wavelength $\lambda_i$ impinges upon the array at an angle $\theta_i$ where $\theta_i = \cos^{-1} \lambda_i / 2\lambda_0$.

Figure 5:
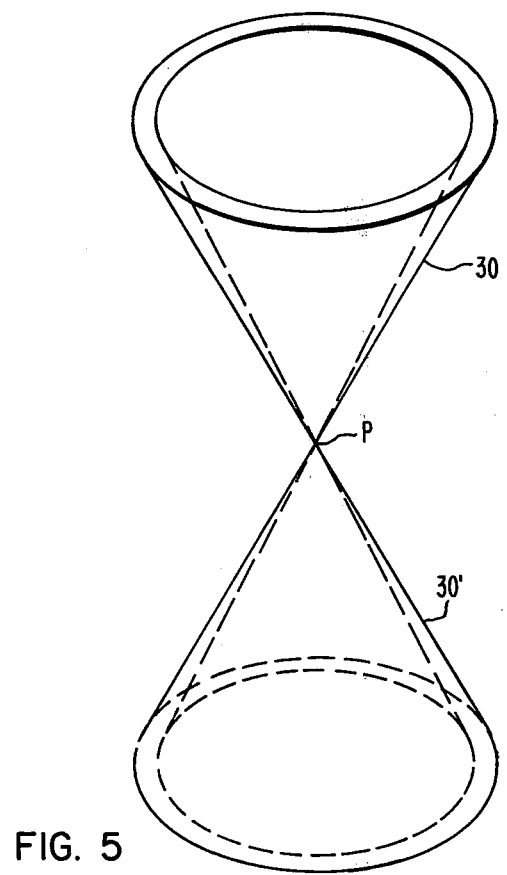
FIG. 5 illustrates beam formation with the apparatus of FIG. 3.

Considering just an outermost hollow conical beam as representative, the apparatus of FIG. 3 in actuality forms a double conical beam as illustrated in FIG. 5. A first hollow conical beam 30 can be considered to be examining an area above point P, at which the apparatus would be located, while a second hollow conical beam 30' may examine the area below point P. One of the cones may be eliminated in order to avoid ambiguous detection, by means of sufficient acoustic absorbing material placed above or below the apparatus. Another method by which one of the beams may be eliminated is by a particular construction of the apparatus, as illustrated in FIG. 6 wherein components previously described have been given the same reference numeral.

Figures 6, 10:
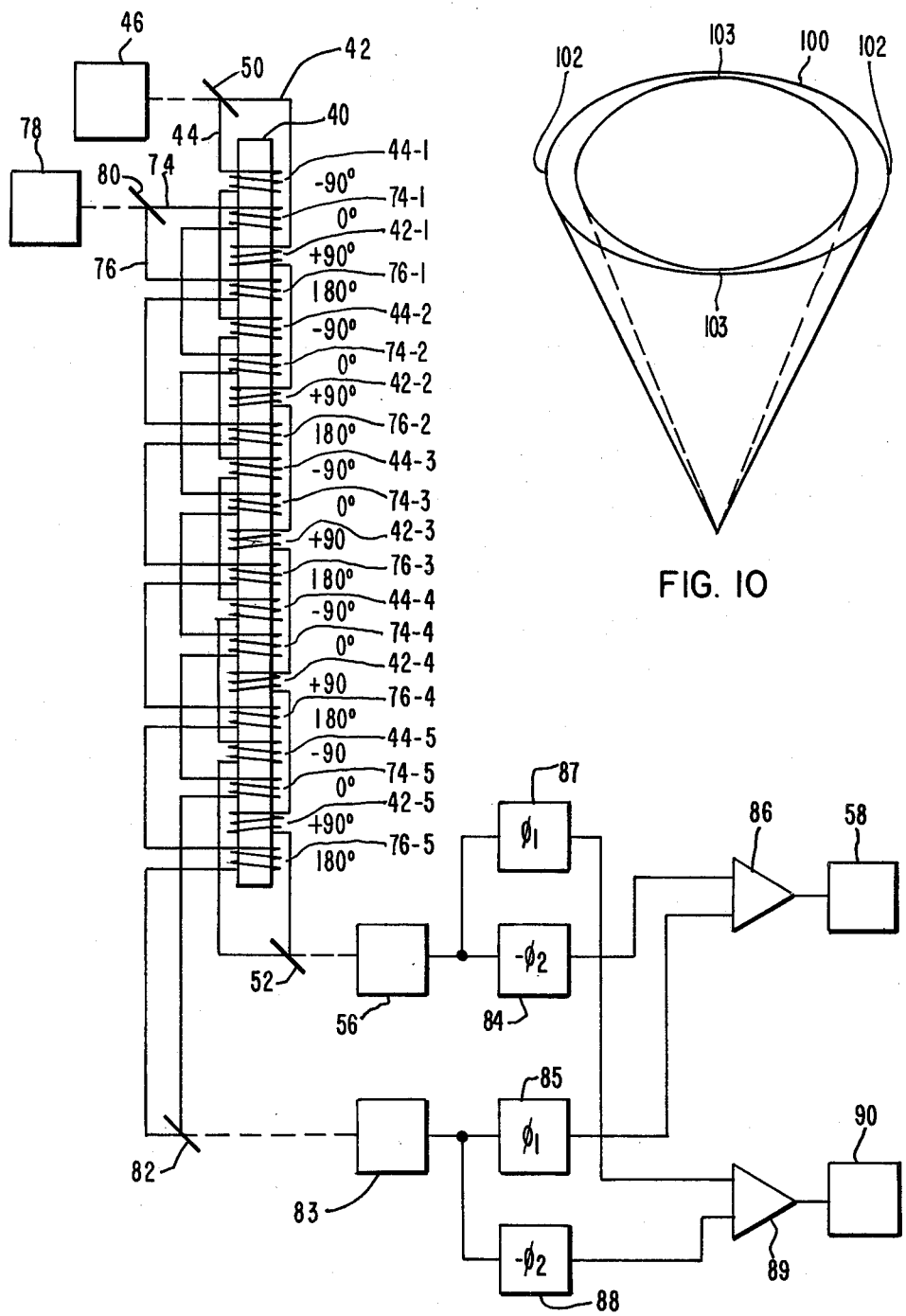
FIG. 6 illustrates a modification of FIG. 3 for eliminating one of the hollow cones illustrated in FIG. 5.
FIG. 10 serves to illustrate a weighted beam pattern.

Basically, FIG. 6 duplicates FIG. 3 and further includes additional windings in the form of third winding 74 and fourth winding 76 each having a plurality of coils 74-1 through 74-5, and 76-1 through 76-5. The spacing of all of the coils are such so as to give the relative phasing as illustrated to the right of the coil arrangement. For clarity the relative optical phase adjuster (device 64, 66 of FIG. 1) is not shown in FIG. 6, or subsequent figures.

In a manner similar to the first and second windings, the third and fourth windings are provided with a light signal from laser 78 in conjunction with beam splitter 80. The light beams emerging from windings 74 and 76 are combined in beam splitter 82 and provided to photodetector 83.

The signal from detector 56 will lead the signal from detector 83 by 90° of phase for a signal coming in an upper cone beam. The opposite phase relationship will exist for a signal coming in a bottom cone beam. By shifting the phase of one detector output relative to the other by 90°, the signals can be made to add for one cone and subtract for the other. One method for accomplishing this is to use "all pass" filter techniques and phase shift one signal by $-\phi_2$ in filter 84 and the other by $+\phi_1$ in filter 85. The two filters are designed such that $\phi_1 + \phi_2 = 90°$ over the frequency band of interest. The two signals are summed in amplifier 86 and spectrum analyzed in analyzer 58. The output from analyzer 58 has only upper cone information. In a similar manner the bottom cone beams are formed by filters 87 and 88, amplifier 89 and spectrum analyzer 90.

Figure 7:
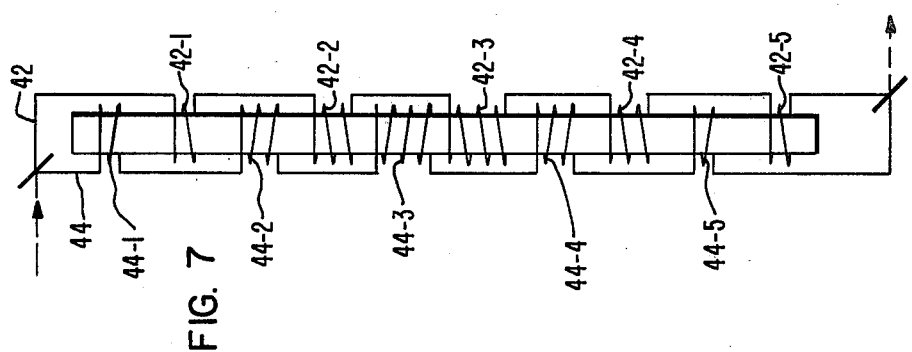
FIG. 7 illustrates a portion of the apparatus similar to FIG. 3 to show the concept of shading.

Many sonar systems having transducer arrays utilize some form of shading to tailor a beam pattern to a desired shape. FIG. 7 illustrates a form of shading which may be utilized with the present invention. The shading is accomplished by varying the number of turns of the various coils. For example, the center coils 42-3 and 44-3 are wound to include more turns than the neighboring coils, which themselves have more turns than the end coils 44-1 and 42-5. The sensitivity of the array may also be adjusted by varying the number of layers of turns from the center to the end of the array.

Figure 8:
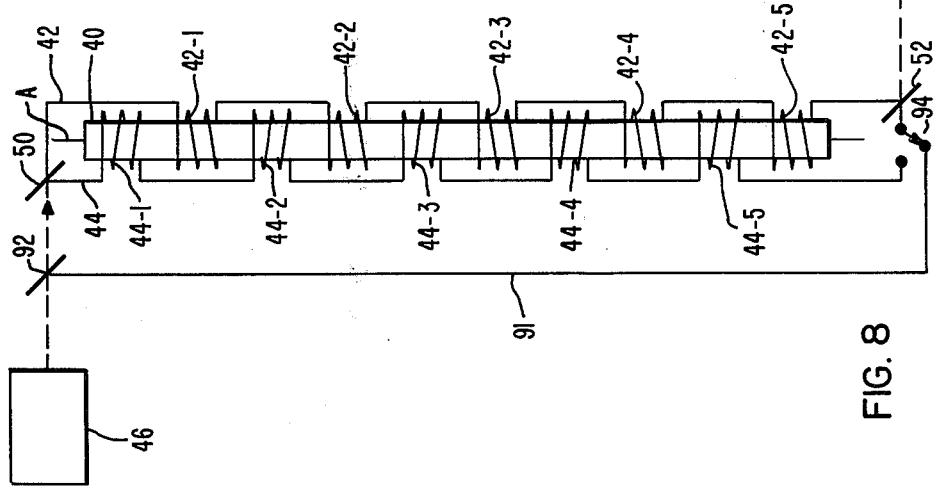
FIG. 8 illustrates an embodiment which further provides for the low frequency detection of a target.

The apparatus of the present invention may be adapted to form an omnidirectional beam as described in FIG. 2A and as is presently done in prior art fiber optic sonar systems. As illustrated in FIG. 8, this capability is accomplished with the provision of a reference optical fiber 91 which is isolated from the acoustic signal. A beam splitter 92 receives the light energy beam from laser 46 and supplies it to one end of the optical fiber 91 while an optical switch 94 is operable, in the position illustrated, to beat the reference signal, unaffected by the acoustic pressure variations, with the signal in winding 42, exposed to the pressure variations. After a detection has been made, the apparatus may operate in the mode as described in FIG. 3 by switching optical switch 94 to its other position.

Figure 9:
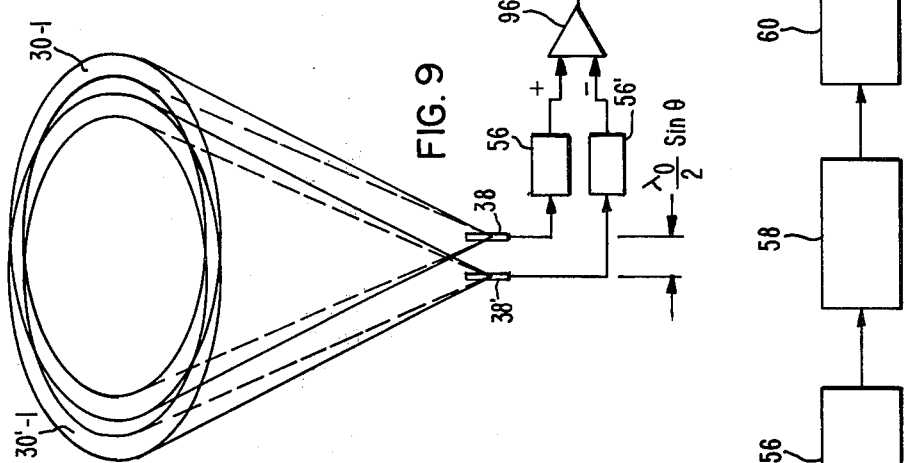
FIG. 9 illustrates the apparatus of FIG. 3 in a dipole configuration.

Multiple arrangements of the basic transducer illustrated in FIG. 3 may be utilized to generate different beam patterns. For example, a dipole type pattern can be generated by the arrangement illustrated in FIG. 9. A first transducer 38 and associated photodetector 56 produces one or more hollow conical beams, one of which 30-1 is illustrated. A duplicate transducer 38' in conjunction with photodetector 56' produces the beam 30'-1. With the wavelength of acoustic energy detected by beams 30-1 and 30'-1 being $\lambda_0$, the spacing between the two transducers 38 and 38' is $(\frac{1}{2})\lambda_0 \sin \theta$.

The outputs of the photodetectors 56 and 56' are provided to a differential amplifier 96, the output of which is fed to an output utilization means 98, and the result of which is to form a weighted beam such as beam 100 in FIG. 10 wherein the weighting is represented by the thicker portions 102 which relatively decrease to the thinner portions 103, 90° therefrom. Such beam in conjunction with an omnidirectional beam may be utilized to determine the bearing of a target intercepted by the cone.

What I claim as my invention:

1. A passive fiber optic sonar detection system, comprising
   (A) a first optical fiber winding, having first and second ends and arranged in a plurality of first coils disposed along and about a central axis;
   (B) a second optical fiber winding, having first and second ends and arranged in a plurality of second coils disposed along and about said axis;
   (C) said first and second coils being alternately arranged along said axis;
   (D) a light transmitter optically coupled to said first ends of said first and second optical fiber windings for projecting a light energy beam thereinto;
   (E) means for combining the light energy beams which emerge from said second ends of said first and second optical fiber windings;
   (F) means for detecting said combined beams and for providing an electrical signal indicative thereof; and
   (G) means for analyzing said signal to detect the presence of at least one certain frequency, corresponding to a detecting receiver beam having the form of a hollow cone.

2. Apparatus according to claim 1 which includes
   (A) a support member which extends along said axis;
   (B) said first and second optical fibers being wound about said support member.

3. Apparatus according to claim 1 wherein:
   (A) said means for analyzing detects the presence of a plurality of frequencies, each corresponding to a hollow cone receiver beam, said hollow cones being concentric about said axis.

4. Apparatus according to claim 1 which includes:
   (A) means for selectively varying the optical phase relationship of said light energy beams in said first and second optical fiber windings.

5. Apparatus according to claim 1 wherein:
   (A) the number of turns of a particular one of said coils varies in accordance with the location along said axis of said coil.

6. Apparatus according to claim 1 which includes
   (A) third and fourth optical fiber windings arranged in respective pluralities of third and fourth coils alternately positioned with said first and second coils;
   (B) means for projecting a light energy beam into said third and fourth optical fiber windings at first ends thereof;
   (C) second means for combining the light energy beams which energize from the second ends of said optical fiber windings;
   (D) second means for detecting said combined beams of said second and third optical fiber windings for providing a second electrical signal inductive thereof; and
   (E) circuit means for combining said electrical signal and second electrical signal in a predetermined manner.

7. Apparatus according to claim 1 which includes
   (A) a reference optical fiber;
   (B) means for projecting a light energy beam into one end of said reference optical fiber;
   (C) means for combining the light energy beam which emerges from the other end of said reference optical fiber with the emerging light energy beam from only one of said first or second optical fiber windings and for preventing combination of the light energy beams in said first and second optical fiber windings.

8. Apparatus according to claim 1 which includes:
   (A) another set of items (A) thru (F) spaced from said first set; and
   (B) means for combining the two electrical signals and analyzing the result.

* * * * *